April 27, 1926.

G. MINIOTTI

1,582,341

BALL TRANSMITTING APPARATUS

Filed July 6, 1922    8 Sheets-Sheet 1

Inventor.
Giovanni Miniotti,
By [signature] atty.

April 27, 1926.

G. MINIOTTI

BALL TRANSMITTING APPARATUS

Filed July 6, 1922

Inventor.
Giovanni Miniotti
By [signature] Atty.

April 27, 1926.

G. MINIOTTI 1,582,341

BALL TRANSMITTING APPARATUS

Filed July 6, 1922

G. MINIOTTI

1,582,341

BALL TRANSMITTING APPARATUS

Filed July 6, 1922    8 Sheets-Sheet 5

April 27, 1926.

G. MINIOTTI 1,582,341

BALL TRANSMITTING APPARATUS

Filed July 6, 1922  8 Sheets-Sheet 7

Inventor.
Giovanni Miniotti
Atty.

April 27, 1926. 1,582,341

G. MINIOTTI

BALL TRANSMITTING APPARATUS

Filed July 6, 1922 8 Sheets-Sheet 8

Inventor
Giovanni Miniotti,
By [signature]
Atty.

Patented Apr. 27, 1926.

1,582,341

UNITED STATES PATENT OFFICE.

GIOVANNI MINIOTTI, OF TURIN, ITALY.

BALL-TRANSMITTING APPARATUS.

Application filed July 6, 1922. Serial No. 573,107.

*To all whom it may concern:*

Be it known that I, GIOVANNI MINIOTTI, a subject of the King of Italy, and resident of 8 via Perrone, Turin, in the Kingdom of Italy, have invented certain new and useful Improvements in Ball-Transmitting Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an apparatus for forming along a line characteristic arrangements of a certain number of balls, that may be regarded as a representation of signals according to a certain code. The resulting combinations may then be used for the transmission of corresponding signals.

The apparatus is similar to a typewriter and is provided at its upper part with a horizontal plate. On this plate and parallel to its plane rotates a disc, drawing along a number of balls that are situated in perforated rings of the said disc and are caused to roll on the plate. All the balls project partially from the plane of the disc and their projecting portions actuate an automatic transmitter, mounted in a rotating arm placed on the same axis as the disc.

Not all the holes of the disc are occupied by balls; some are empty. The transmitter mounted on the double rotating arm rotates in a direction opposite to that of the disc and when it meets holes occupied by balls it transmits positive impulses by means of an angle lever with shoes; on the contrary, when it contacts with free holes negative impulses are produced.

The disc rotates backwards when the keys of the apparatus are lowered, therefore the rotation speed of the disc varies according to the speed at which the keys are actuated.

On the contrary, the transmitter rotates in a direction opposite to that of the disc and at a constant speed, being actuated by means of an electro-magnet fed by cadence current.

The balls do not remain always in the same position in the holes of the disc; on the contrary, they are constantly changing their position. This takes place by means of a combination device placed at the back of the apparatus.

When the holes of the disc are on the combination zone new balls will reach the empty holes, whereupon a part of said balls will be driven away from the disc.

This invention can be used in all cases in which signals are to be transmitted. In the example that will be hereinafter described I have shown the use of my ball transmitter in connection with a Baudot telegraphic system. This is the most important and best known of all telegraphic systems, as it not only affords the greatest efficiency along the whole line, but it also permits the connection of different centres by the aid of a single line wire. Its superiority over other systems is, however, limited by the fact that its power of transmission depends on the skill and speed of the operator who has to form the combinations directly by using several keys at the same time and at fixed instances (cadences). Insufficient skill on the part of the operator, fatigue, a jaded nervous system or inaccuracy and difficulty in the transmission by the Baudot key are causes which limit the practical efficiency of the Baudot telegraph.

From the first, when this system was applied to important lines, the necessity of improving its system of transmission has been felt, and attempts have been made to improve it, for instance by using a perforated band, but no good result has been attained.

A practical solution of the problem which furnishes a high degree of efficiency is effected by the ball transmitter which forms the subject matter of the present invention and permits of obtaining:

The mechanical formation of the combination by a single key.

The suppression of the cadence for the person transmitting;

The automatic return of the signal over the line;

The possibility of using easily all the cadences (thus raising the practical efficiency to the maximum power of the system).

The reduction of the number of operators for the group, the person transmitting having his hands free of the keyboard without interrupting the transmission and being thus enabled to record and rectify the telegrams.

The possibility of the operator stopping to have a rest for a short time without interrupting the transmission and without diminishing the efficiency of the apparatus.

The possibility of increasing the working speed of the apparatus.

The possibility of applying the universal keyboard to the typewriter, by suitably varying the type wheel thus obtaining the advantage of enormously facilitating the instruction of the operators.

In the accompanying drawings is shown by way of example the application of the ball transmitter to the Baudot system of telegraphy.

Figures 11 and 12 show the device for advancing and arresting the ball carrying disc.

Figures 13, 14, 15 and 16, 26 and 27 show the escapement mechanism of the supporting arm of the automatic transmitter in different phases of working.

Figures 17 and 18 are respectively a rear view and a front view of the automatic transmitter.

Figures 20 and 21 show diagrammatically the working of the automatic transmitter.

The frame of the apparatus comprises two dismountable parts, namely the base plate 1 (see Figures 2, 3 and 4) and the platform 2 (see Figures 1, 3, 4, 5, 6, 7, 8, 9 and 10).

This latter is carried by means of four uprights 3 (see Figures 4, 7) on the base plate which is fixed by the aid of ogival pivots 4 (see Figures 2 and 3) and by two screws. On the base plate 1 are fixed by the aid of shafts pivoted at 5 on supports 6 (see Figures 2 and 3) the key levers 7 (see Figures 1, 2, 3 and 4), the said levers carrying on their front arms keys 8 (see Figures 1, 2, 3) and being provided on their back portion 9 (Fig. 3) with cavities and teeth representing the particular signal of the key.

The levers 7, guided by the guiding comb 9' (see Figures 2 and 3) lift by their oscillation, which is limited by the bars 10 and 11 (see Figures 2 and 3), the combination frames 12 (see Figures 2, 3 and 4) which lie above the teeth of the lever portion 9. The combination frames which are mounted capable of oscillation on the base plate are five in number, that is to say they correspond to the code of five units adopted by the Baudot system. Each lever raises by its end the advancing frame 13 (see Figures 2, 3 and 4) which by the aid of the bell crank lever with its pivoted joint 14 (see Figures 2 and 4) transmits the alternating movement to the rod 15 of the advancing slide 17 sliding in the relative supports 16 thus producing the compression of the springs 39 (see Figures 4, 7).

Figure 4:
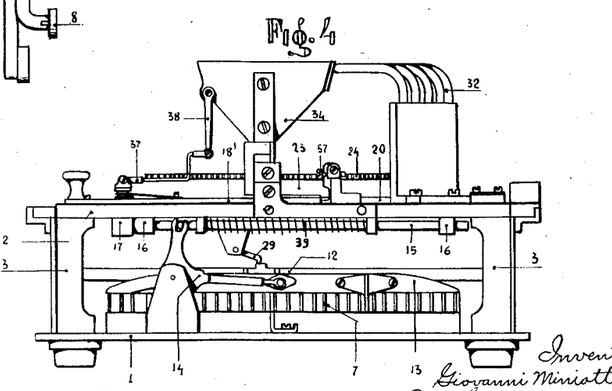
Figure 4 is a rear view thereof, some of its parts being omitted.
Figure 11:
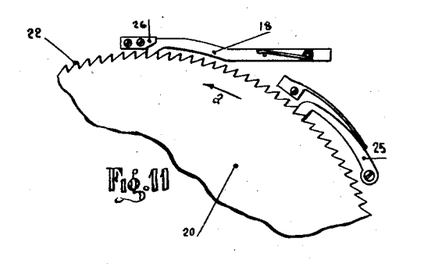
Figures 12, 16, 17, 18, 21:
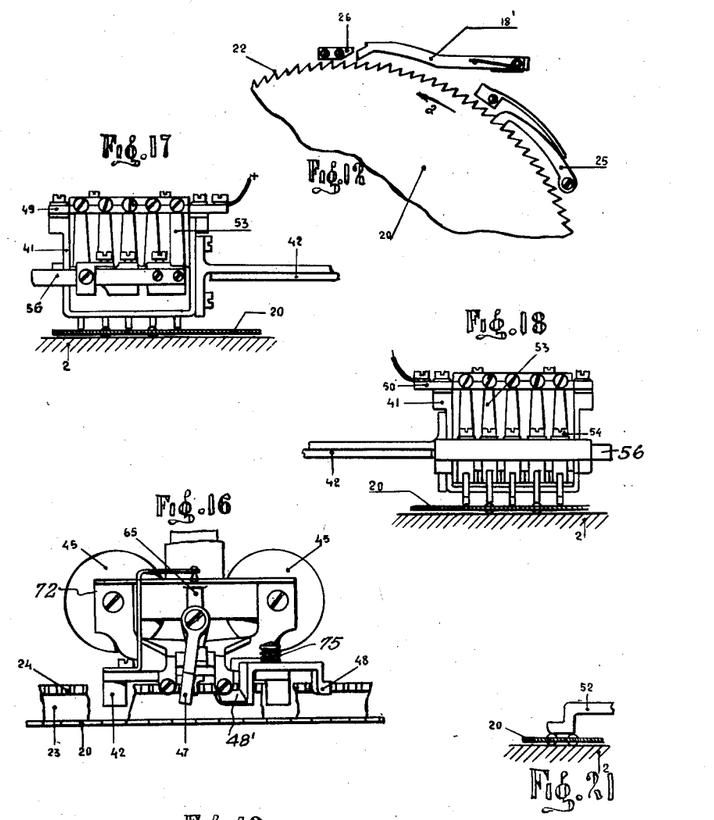

The advancing slide 17 (see Figures 4, 7) fixed to the rod 15, is movable in the slot 18 (see Figure 7) formed in the platform and it operates the advancing tooth 18' (see Figures 4, 11 and 12).

Figure 5:
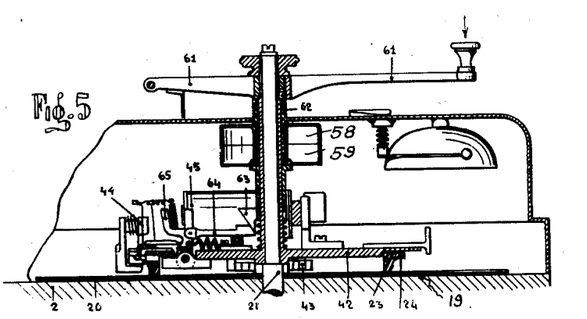
Figure 5 is an axial section of the supporting arm of the automatic transmitter.
Figure 6:
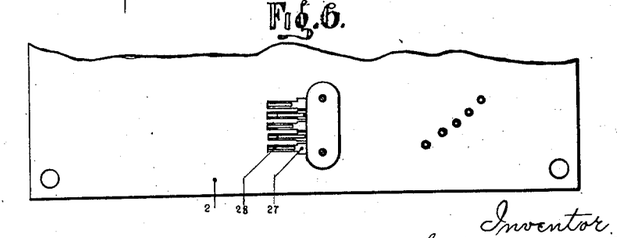
Figure 6 shows the discharge openings in the platform for the balls.
Figure 7:
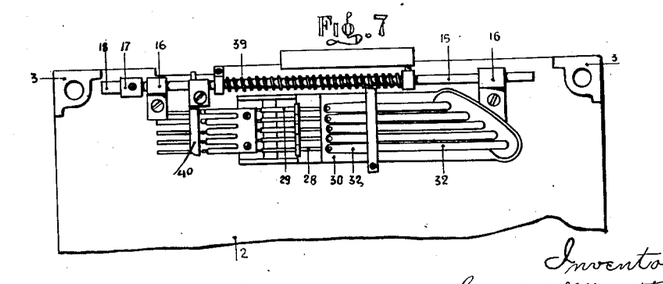
Figure 7 is an underneath plan view of the rear end of the platform with the circulating channels for the balls.

On the platform 2 is carried by the aid of eight balls 19 (see Figure 5) penetrating partially into the said plate, the disc 20 (see Figures 1, 4, 5, 8, 9, 10, 11, 12 etc.) turning about the central shaft 21 (see Figure 5).

Figure 1:
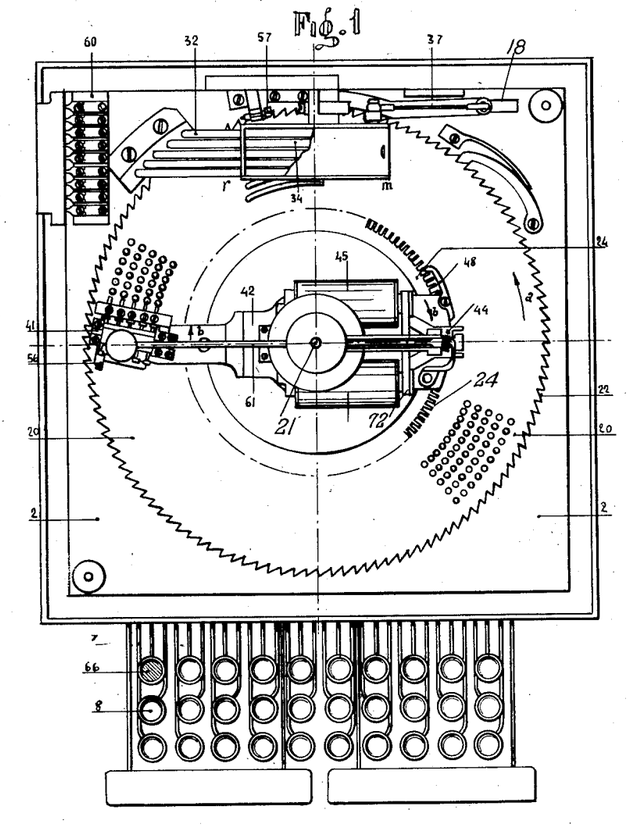
Figure 1 represents the ball transmitter seen in plan.
Figure 2:
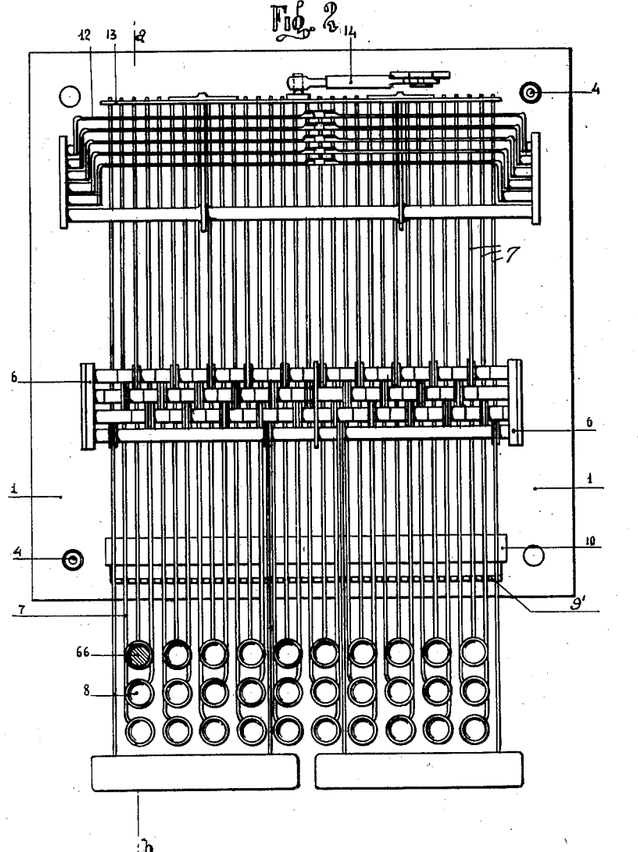
Figure 2 is a plan view of the base plate.
Figure 3:
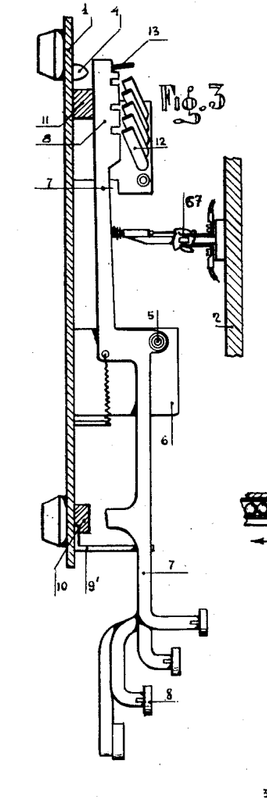
Figure 3 is a section of the transmitter on the line a—b of Figure 2.

The disc has five rings of holes in it arranged in radial series and it carries on its periphery the series of teeth 22 for advancing it (see Figures 1, 11 and 12).

The concentric ring 23 (see Figures 4, 5, 13, 14, 15 and 16) is rigidly connected to the said disc and carries the toothed escapement ring 24 (see Figures 1, 4, 5, 13, 14, 15 and 16).

The rotary movement of the disc takes place intermittently in the direction of the arrow "a" (see Figures 1, 8, 9, 10, 11 and 12) and it is obtained by the aid of the ratchet tooth 22 and the feed tooth 18' (see Figures 11 and 12) limiting by its form and by the aid of stop 26 the angular progression to a fixed value.

The intermittent movement of the disc causes the balls contained in the holes to roll over the platform, so that the radial series are successively brought into correspondence with five openings 27 (see Figure 6) formed in the platform and normally closed by the shutters. The balls finding the shutter of the corresponding opening closed, will pass thereby being supported by the shutter. The others on the contrary which find the shutter open and which will no longer be supported by this latter will fall through the openings in the receiving block 30 (see Figures 8, 9 and 10) of the conduit of the supply line.

In this way the formation of combinations of balls is obtained. The balls which have not dropped will continue to move and roll over the platform driven by the disc and will produce (in the successive transmission of the signals) positive impulses. The holes left free by the balls correspond to negative impulses.

Figure 8:
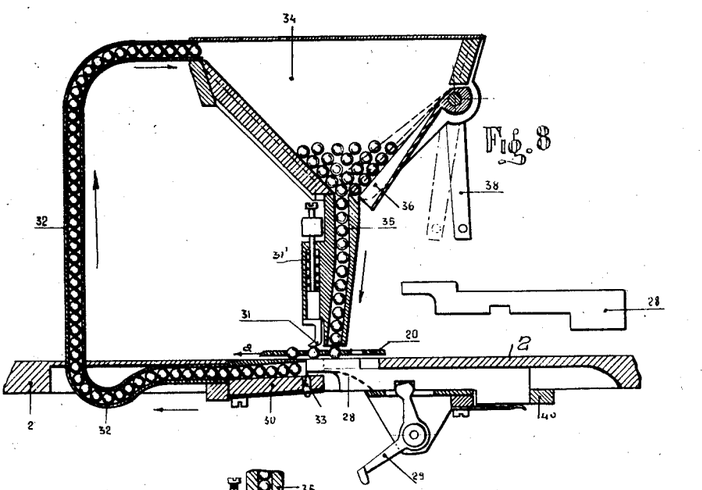
Figure 8 is a section on an enlarged scale of the circulating apparatus for the balls.
Figure 9:
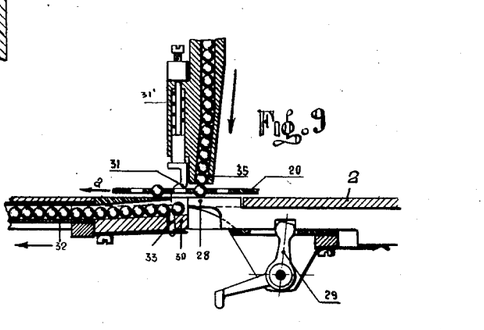
Figure 9 is a section on an enlarged scale of the platform in correspondence with a discharge hole, the shutter being in its open position.
Figure 10:
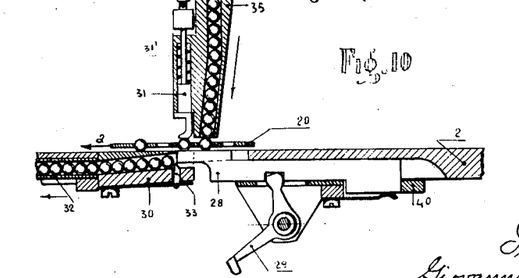
Figure 10 is the same section shown in Figure 9 the shutter being in its closed position.

The balls which dropped into the receiving block 30 (see Figures 7, 8, 9, and 10) are gradually forced into the feed pipe 32 (see Figures 1, 4, 7, 8, 9 and 10) through the valves 33 (see Figures 7, 8, 9 and 10) and afterwards admitted to the reservoir 34 (see Figures 1, 4 and 8). The balls are thus operated by the shutter 28 (see Figures 6, 7, 8, 9 and 10) in its return stroke produced by the return arm 40 (see Figures 7, 8, 10) integral with or fixed in any manner to the rod 15 (see Figure 7).

The tubes of the conduit 32 being always filled with balls the introduction of one of them into the lower part of it causes another ball at the top to fall into the reservoir.

From his latter, through the distributing conduits 35 (see Figures 8, 9 and 10) the balls agitated by the movable bottom 36 (see Figure 8) operated by the slide 17 through the medium of the connecting rod 37 and crank 38 (see Figures 1, 4 and 8) will descend to fill the holes in the disc not occupied by the balls which gradually come under the distributing block, so that the radial series of holes in the disc are successively brought over the openings 27 always completely occupied by balls which will remain in a waiting position supported by the shutters, ready for the formation of the next signal. In order to cause the ball to drop through the openings 27 on to receiving block 30, there is provided in front of each distributing conduit 35 an auxiliary pressing shoe 31, which is pushed down by the action of the spring 31' until it is flush with the upper surface of the disc 20.

By the passage of the balls from the feeding conduits 35 to the disc the combinations formed on the preceding revolution of the disc are cancelled. The balls thus accomplish a veritable circulation, viz. receiving block, valves, discharge conduits, reservoir and feeding conduits. The functions of the various parts take place in the following manner:

On the depression of a key 8 the combination frames 12 which lie above the teeth of section 9 of the lever 7 carrying the depressed key are raised; the levers 29 (see Figures 3, 7, 8, 9 and 10) move the shutters 28 (see Figure 9) and these latter cause the respective superposed balls to drop. The advancing frame 13 is also raised which, with the bell crank lever 14, moves the rod 15 on the left compresses the advancing spring 39 (see Figures 4, 7 and moves, through the slide 17 the advancing tooth 18' into the position of Figure 12 and also operates the movable bottom member 36.

On releasing the key the various parts resume their position of rest by the action of the spring 39. The shutters on their return stroke which is produced by the return arm 40 (see Figures 7, 8 and 10), fixed to the rod 15, push forward the balls which have dropped (see Figure 10). These latter produce the admission of as many balls into the reservoir, the movable bottom 36 is returned to normal position and the advancing tooth causes the disc to advance by one radial section. The angle levers 14 and 29 are so proportioned that the displacement of the rod 15 and consequently of the return arm 40 is considerably greater than the displacement of the shutters 28, so that on releasing the key, the return arm 40 effects a part of its movement without producing any action before it strikes against the shutters to bring them into closing position. The closure of the shutters will thus be retarded so that the balls will be sure to fall, whatever the speed of operation of the keys may be. The utilization of the combinations thus recorded on the disc is obtained by the automatic transmitter 41 (see Figures 1, 17, 18, 19 and 20) mounted on the double rotating arm 42 (see Figures 1, 5, 13, 14 and 15, etc.) pivoted on the central shaft 21 and turning in a plane parallel with the disc. This arm is continually incited by the spring 43 (see Figure 5) to turn in the direction of the arrow "b" (see Figure 1) opposite to that of the rotation of the disc and it advances intermittently by the action of the escapement mechanism 44 (see Figures 1, 5) worked by the electromagnet 45 (see Figures 1, 5, 13, 14, 15 and 16).

Figure 24:
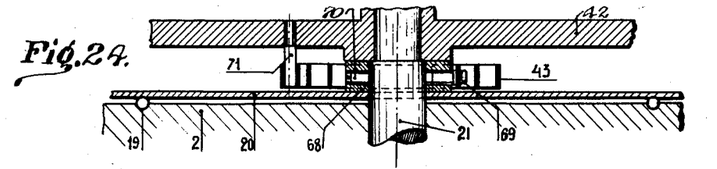
Figures 24 and 25 show in plan view and in section, respectively, the spring of the supporting arm of the transmitting apparatus.
Figure 25:
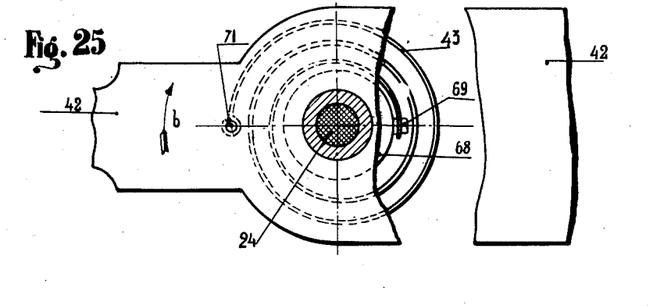

The spring 43 is connected at one end with a fixed hook 69 (Figs. 24 and 25) screwed on the ring 68 secured to the axle 21 by means of the screw 70 (Fig. 24). The other end of the spring is connected with the pin 71 secured to the rotating arm 42.

When this latter is in the position "r" (Fig. 1), the spring 43 has already an initial charge that will increase, if the arm moving in a counter-clockwise direction, moves toward the position "m". The tension of the spring 43 would have for its effect to cause the arm 42 to rotate quickly from the position "m" to the position "r" in the direction "b", but this cannot take place, the escapement mechanism 44 (Fig. 1) allowing only of a step-by-step movement.

Figure 13:
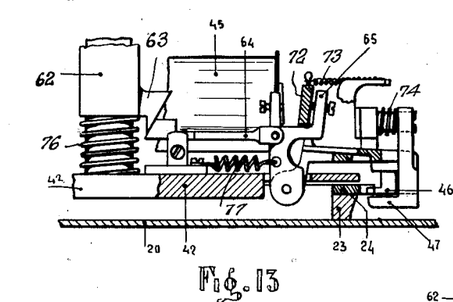
Figure 14:
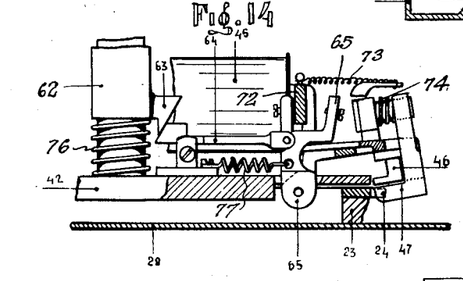
Figure 15:
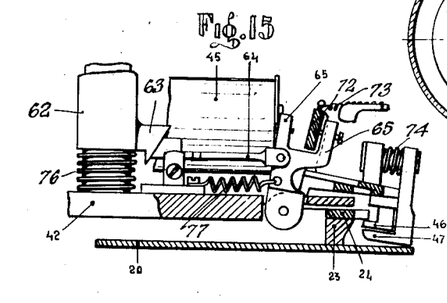
Figure 19:
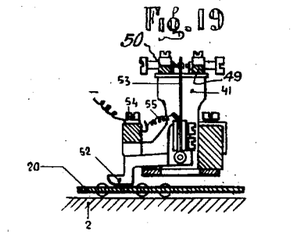
Figure 19 is a transverse section thereof.
Figure 20:
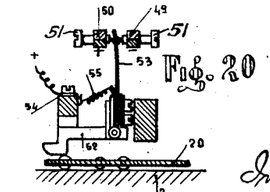

The armature 72 of the electromagnet 45 rests against the escapement arm 65 owing to the action of the spring 73. In this position of the armature, the pawl 46 connected with said armature, engages with the toothed rim 24 (Fig. 13) while a pawl 47 pivoted to a bracket of the armature in such a way as to be allowed to oscillate within a space equal to the interval between the teeth of rim 24, will be in its disengaged position under the notch in the toothed rim 24 adjacent in direction "b" to the notch occupied by the pawl 46 and is kept in this position by the spring 73 (Figs. 13, 14 and 15). When the electromagnet is energized the armature 72 and pawls 46 and 47 are in the position shown in Figures 14 and 26. In this position the pawl 46 is disengaged from the toothed rim 24, while pawl 47 has become engaged within the notch under which it was lying in the preceding step. At the same time the arm 42 rotates in the direction "b" through an angle equal to the interval between the teeth of the toothed rim owing to the action of the spring 43 (Figs. 24 and 25) which overcomes the action of spring 74 and causes the oscillating pawl 47 to assume the position shown in Fig. 26, while the pawl 46 carried along by the arm 42 is brought over the notch now occupied by pawl 47. By again breaking the current in the electromagnet, the armature is returned into the position shown in Figs. 13 and 16, in which the pawl 46 becomes engaged in the notch previously occupied by the pawl 47 that is in the notch adjacent in the direction "b" to the notch it occupied during the preceding break of the circuit of the electromagnet, while the pawl 47, that has become disengaged from the toothed rim, is brought under the notch preceding in the direction "b" the notch now occupied by the pawl 46.

Figure 26:
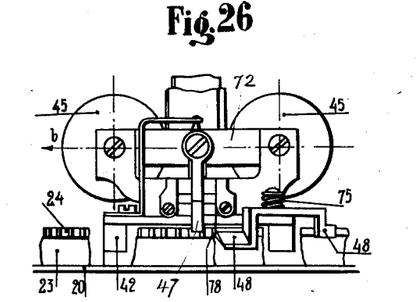
Figure 26 is a rear view of the escapement mechanism in a different position from that shown in Fig. 16.
Figure 27:
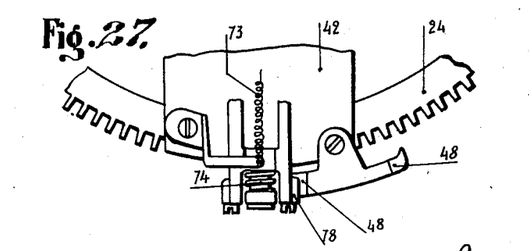
Figure 27 is a plan view showing the detent pawl.

In the position shown in Figs. 13 and 16, as well as in that shown in Figs. 14 and 26, an auxiliary pawl 48, (Figs. 16, 26 and 27), which is so arranged as to allow the rotation of the arm 42 in the direction "b" and prevent its rotation in the opposite direction, is always in engagement with the toothed rim 24 (as shown in Fig. 1), owing to the action of the spiral spring 75, (Figs. 16 and 26) in order to prevent the rotation of the arm 42 in the direction "a". This pawl 48 is provided with an inclined surface 48' (Figs. 16, 26 and 27,) the action of which will be hereinafter explained. The rotating movement of the arm 42 therefore takes place step-by-step at each closing and opening of the circuit of the electromagnet.

The transmitter (see Figures 17, 18, 19, 20 and 21) is constituted by the frame 41, the positive bars 49 and the negative bars 50 each carrying the contact screws 51, and five bell crank levers 52 with shoes, each carrying an insulated flexible tongue 53, electrically connected to the terminals 54 by the aid of the tension spring 55. The commutator 56, (Figs. 1, 17, 18, 28 and 29,) fixed on the frame of the transmitter rests normally on the screw 79 (see Fig. 28) allowing of the flow of the positive current in the rod 49. When the transmitter reaches the position "r" (Fig. 1,) after having transmitted the last stored signal, it will still advance a little until the commutator 56 strikes against the screw 57 and brings it into contact with the screw 80, thus inverting the polarity of the rod 49, that will therefore be run by negative currents. Under these conditions, whatever be the combination of balls left under the shoes of the transmitter, this latter will only send negative impulses.

In the rotation of the transmitter the shoes which are raised by the tops of the balls projecting from the disc move the relative tongues of the negative contact to the positive contact so that the combinations are accurately transmitted to the line by said tongues supplied with the positive or the negative current according as the respective shoe, advancing intermittently, stop over empty holes or holes occupied by the balls. The transmission thus effected will be sure and perfect and furthermore it will be continuous or sustained that is to say in consequence of the shape of the shoes and of their length corresponding to the distance of the centres of the two successive balls (see Figure 21.) The positive contacts determined by a combination are held and utilized in the transmission of the succeeding combination, if this latter contains one or more positive elements arranged in the radial series, similar to the preceding combination. This quality, which has not been attained hitherto, renders the conditions of transmission perfect by reducing to an indispensable minimum the number of makings and breakings of the circuits with the advantage of reduced wear and tear of the contacts and of the flexible springs 53. By the action of a flat spring 43 (see Figure 5) the double rotating arm 42, and consequently the transmitter, are incited to turn (see the arrow "b") towards the position of rest "r".

The escapement mechanism 44 (see Figure 1) operated by the electromagnet 45, electrically connected to the distributor of the Baudot group, permits the transmitter to make successive and intermittent angular movements over the combinations, at a cadence corresponding to the normal speed of the apparatus.

The perfect independence of the formation of the combinations and their transmission is thus obtained, because, while the disc 20 rotates in the direction of the arrow "$a$" at a variable rate of speed, the transmitter rotates in the direction of the arrow "$b$" at a constant speed (corresponding to the cadence of the apparatus). If the speed at which the disc 20 advances is kept higher than that of the transmitter, this latter rotates in the direction "$a$" by reason of the difference of the speeds and will be gradually brought into the position "$n$" (Figure 1) which is the position of the maximum record. If the speed of the disc in the direction "$a$" corresponds to that of the transmitter in the direction "$b$" this latter will not change its position during working. If finally the speed of the disc be kept lower than that of the transmitter this latter will be brought at a speed equal to the difference of the two speeds towards the position of rest "$r$".

Figure 22:
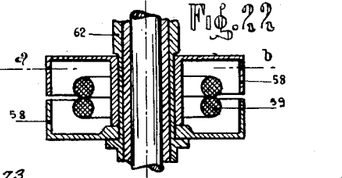
Figures 22 and 23 are an axial and a transverse section respectively of the sheathing of the cable for establishing electrical communication between the automatic transmitter and the terminals of the machine.
Figure 23:
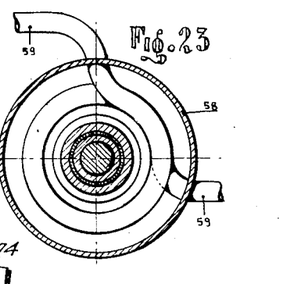
Figure 28:
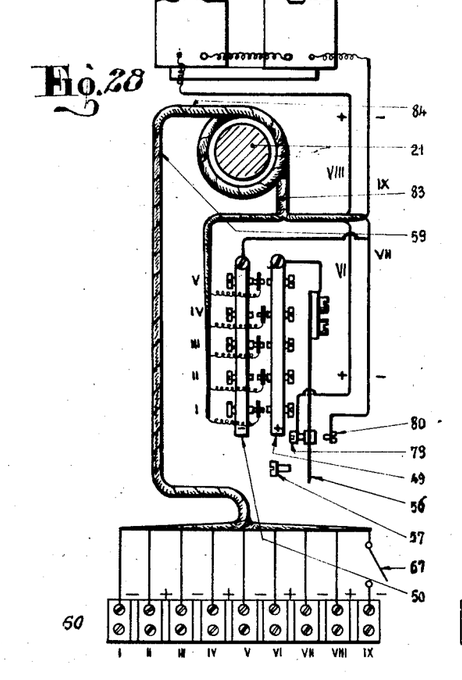
Figures 28 and 29 show diagrammatically the electric connections of the apparatus in the rest and working positions, respectively.
Figure 29:
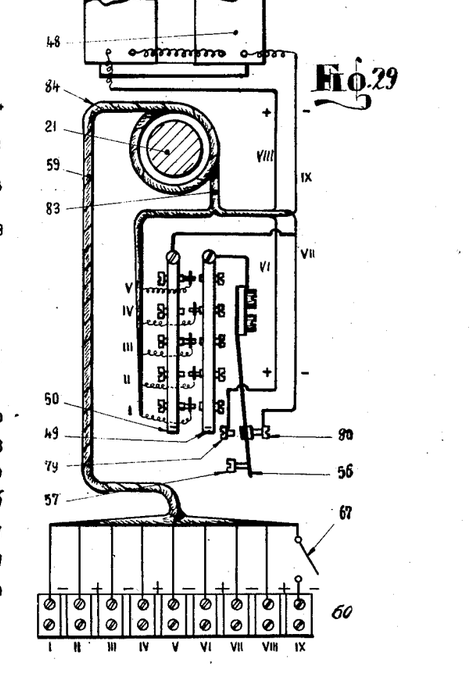

The transmitter and the electromagnet are electrically connected with the terminals of the board 60, (Figs. 19, 28 and 29,) by means of a flexible cable 59 which contains nine conductors: five (I, II, III, IV, V) for the contact springs, two (VI, VII) for the negative and positive currents, and two (VIII, IX) for the electromagnet. This cable is wound in one or two turns around the axle 21 and said turns are enclosed in two rotating cases 58 and 58' (Figs. 22, 23). Said cases are loosely mounted on a sleeve 62 and are allowed to rotate freely and independently from one another. The lower end 83 of the cable (Figs. 28, 29) passes through a hole provided in the wall of the lower case 58' (Fig. 22) and is connected with the transmitter, while the upper end 84 passes through a hole provided in the wall of the upper case 58 and is connected with the fixed board 60 (Figs. 28 and 29). Owing to the fact that the transmitter together with the rotating arm performs an oscillating movement from the position "$r$" into the position "$m$" and vice versa, the cable in the case will not be twisted but will widen and close its turns. The case 58' will follow the movements of the transmitter, while the case 58 will be held by the fixed end 84. By this arrangement it is possible to connect the rotating members directly with the fixed board 60 (Figs. 28, 29) without any intermediate members, such as brushes, slip rings etc. From the keyboard 60 leads a cable which connects the apparatus to the Baudot group.

In order to disengage the rotating arm 42 from the toothed rim 24, a sleeve 62 is depressed by means of the lever 61 (Figs. 5, 13, 14 and 15) and will compress the spring 76, and by means of the inclined surface 63 (Fig. 15) will move the rod 64, which in turn will move the disengaging arm 65 into the position shown in Fig. 15, overcoming the action of a spring 77. In this position the disengaging arm 65 allows the armature 72 and therefore the escapement mechanism to be depressed, owing to the action of the spring 73, in order to disengage both pawls 46 and 47 from the toothed rim 24 (Fig. 15). The escapement mechanism when lowered strikes with its projection 78 (Fig. 26) against the inclined surface 48' of the auxiliary pawl 48, so that this latter will also be disengaged from the toothed rim 24 (Fig. 27), the rotating arm 42 may therefore be displaced in any position.

When the lever 61 is released, the spring 77 (Fig. 15) will return the disengaging arm 65 into its normal position (Figs. 13 and 14) and the escapement mechanism will again engage with the toothed rim. This operation permits of bringing the transmitter into any position from the position of rest "$r$" to the position of maximum storing of signals "$m$" and has the advantage of enabling the apparatus to be instantly set to zero and also of enabling the transmission of what has been recorded on the disc to be repeated at will. This lever 61 may also serve to show externally the transmission of the transmitter.

Figure 30:
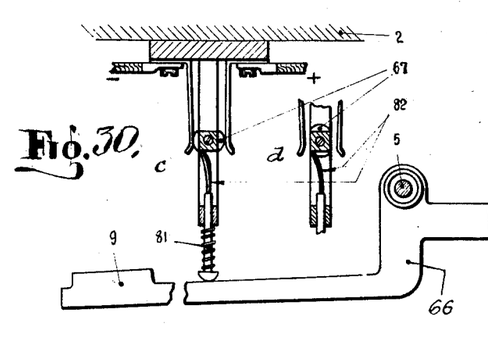
Figures 30 and 31 show the interrupter in section and in elevation.
Figure 31:
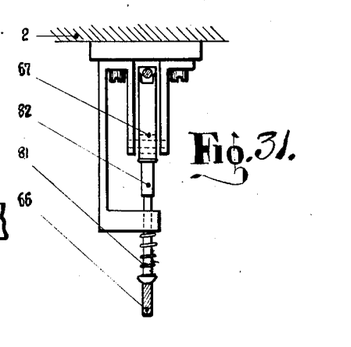

In the circuit of the electromagnet 45 is inserted a push-button switch, (Figs. 3, 28, 29, 30 and 31) comprising a metallic block 67 (Figs. 30, 31) which closes the circuit when it is in the position "$c$" (Fig. 30) and interrupts it when in the position "$d$". Said switch is operated by a key lever 66 (Figs. 1 and 2) through a head 81 and stem 82 (Fig. 31).

If, when the transmitter 41 rotates from the position "$m$" towards the position "$r$", the key 66 is operated (Figs. 1, 28 and 29) the escapement device will be stopped and therefore the transmitter, which will remain on a combination of balls, will permanently send the signal to the line. By acting again on the key 66, the circuit of the electromagnet will be closed and the transmitter again set in motion.

The lever of the key 66 (Figs. 1, 2 and 30) has no notches in its rear part 9; therefore, when it is operated, will raise all five combination frames 12, which, opening the shutters, will cause the five balls of a radial series to fall. If the lever 66 is operated while the transmitter is in the position "$r$", the circuit of the electromagnet will be broken by means of the switch 67 and at the same time all the balls of the radial series situated under the shoes of the transmitter will be removed.

Under these conditions the transmission of signals may be effected twice, namely first on operating the keys 8 the combinations are formed, that will remain stored on the disc 20 carrying the balls and rotating in the direction "a" carrying along the transmitter. In this period of time the transmitter cannot send positive currents on the line, as it is above a radial series completely deprived of balls. Second, when the transmitter has reached the position "m", the lever 66 will again be depressed, closing the circuit VIII, IX, (Fig. 28) of the electromagnet 45 that will operate the escapement device 44 of the transmitter (Fig. 1). This latter will then rotate step-by-step in the direction "b" towards the position "r" passing over the combinations and sending the corresponding signals on the line. This may be especially useful for beginners who transmit at a speed lower than the frequence of the cadences of the Baudot telegraph.

For the application of the ball transmitter to the Baudot apparatus, no modification is required by the apparatus. It is obvious that the number of combination frames, of circular rings or of holes in the disc, limited to five in the apparatus described for use with the Baudot telegraph, may be varied, this possibility being a particular characteristic of the general principle of the present invention.

What I claim is:

1. In apparatus for transmitting signals, a plurality of balls, means to feed in a sequence a number of said balls corresponding to the elements of the signalling code in a combination zone, means operated by the key levers to expel from said zone the balls not pertaining to the signal corresponding to the operated key lever, electric signal transmitting means, and means to move the balls not expelled and representing the selected signal in to operative relation to signal transmitting means.

2. In aparatus for transmitting signals, a plurality of balls, a ball magazine, means to feed in a sequence from said magazine to a combination zone a number of said balls corresponding to the elements of the signalling code, means to expel from said zone the balls not pertaining to the chosen signal, means to return the expelled balls into the magazine, electric signal transmitting means, and means to gradually push forward the combinations of balls not expelled towards the transmitting means, said feeding expelling and advancing means being simultaneously operated by the key levers.

3. In apparatus for transmitting signals, a plurality of balls, a ball magazine, means to feed in a sequence from said magazine to a combination zone a number of balls corresponding to the elements of the signalling code, means to expel from said zone the balls not pertaining to the combination representing the chosen signal, means to return the combination representing the chosen signal, means to return the expelled balls into the magazine, electric signal transmitting means, means to gradually push forward the combination of balls not expelled towards the transmitting means, key levers to operate simultaneously the feeding expelling and advancing means of the balls, and means to move the transmitting electric means independently from the action of the key lever.

4. In apparatus for transmitting signals, a series of balls, a disc having holes therein, means to supply said balls to said holes, a platform beneath said disc to prevent the balls from falling through the disc and having openings at predetermined portions of the platform, means normally closing said openings and operated to release balls from said disc not pertaining to a signal, a transmitter for electrical signals and means to cause the signal controlling balls to assume operative position with respect to said transmitter.

5. In apparatus for transmitting signals, a series of balls, a disc having radial rows of holes therein, means to automatically feed balls to the successive radial rows of holes, a platform beneath said disc to prevent the balls from falling through said disc, the platform having openings therethrough at one point, key-controlled means normally closing said openings, an escapement mechanism to rotate said disc in accordance with manual operation, a transmitter for electrical signals, automatically operated electrical means for stopping said transmitter counter to the direction of movement of said disc, means to permit said key-controlled means to automatically return balls released from said disc to said feeding means.

6. In an apparatus for transmitting signals, a disc having several insular series of holes arranged in radial rows, a hopper, distributing conduits extending from the hopper, there being one conduit for each series of holes and arranged side by side over the holes of a row, a platform beneath the disc and having a hole beneath each conduit, means beneath the platform to receive balls released from the disc, tubes connecting said means and hopper, and key-operated means normally closing the openings in the platform and operating to feed released balls into said tubes and hopper.

7. In an apparatus for transmitting signals, a disc having several insular series of holes arranged in radial rows, a hopper, distributing conduits extending from the hopper, there being one conduit for each series of holes and arranged side by side over the holes of a row, a platform beneath the disc and having a hole beneath each conduit, means beneath the platform to receive balls released from the disc, tubes connecting said means and hopper, key-operated means normally closing the openings in the platform and operating to feed released balls into said tubes and hopper and a movable wall for the hopper also key-actuated, to insure the feed of the balls.

8. In an apparatus for transmitting signals, a disc having step-wise movement, circular series of holes therein, means to feed balls into said holes, a platform beneath said disc having openings beneath said feeding means, key-operated means normally closing said openings, and means to force balls from the disc through said openings when not closed to insure selected balls leaving said disc.

9. In an apparatus for transmitting electric signals, a disc having a circular series of holes therein, means to supply balls into said holes, a platform beneath said disc having openings beneath and a step in advance of said feeding means, key operated means to expel from the disc through said openings the balls not pertaining to the combination representing the chosen signal and simultaneously to step said disc, electrical signal transmitting means co-operating with the balls left in the disc, means to automatically step said transmitting means, manually operated means to render said disc stepping means inoperative at will, and manually operated means to render said signal transmitting stepping means inoperative at will.

10. In apparatus for transmitting electrical signals in combination with a disc and means for feeding to said balls in a sequence of combinations representing the signals to be transmitted, of an arm rotatably mounted on the axis of said disc, an automatic transmitter carried by said arm and an escapement mechanism comprising an electromagnet to be electrically connected with a Baudot apparatus for the purpose of working at the same normal cadence of the said apparatus, a pawl, and an auxiliary pawl to prevent any undesirable sliding of the said supporting arm.

11. In apparatus for transmitting electrical signals, the combination with a ball receiving plate; of a platform below said plate having discharge openings, a shutter normally closing said openings, a receiving block below said openings, a latch or valve, and a tube extending from said block and valve, said shutter operating to uncover an opening and, on its closing movement force a ball that has dropped onto said block past said latch and into said tube.

12. In apparatus for transmitting electrical signals, a plurality of balls, a hopper for said balls, a rotating disc having several series of holes arranged in radial rows, said radial series having a number of holes corresponding to the number of elements of the chosen code, a corresponding radial series of distributing conduits extending from said hopper to and above said radial series of holes, an agitating wall for said hopper adjacent to the upper end of said conduits, a platform beneath the disc and having openings in correspondence with the outlets of said distributing conduits, tubes for receiving balls discharged through said openings and extending to said hopper, and key controlled means to permit balls to be dropped from said openings to the entrances of said tubes and force the balls through said tubes back to said hopper.

13. In an apparatus for transmitting electric signals, a platform having openings therein, key-retracted shutters normally closing said openings and means common to all the shutters for closing them, said means having a partially idle stroke whereby said openings are maintained open for a period of time greater than that required for the traverse of said shutters.

14. In an apparatus for transmitting electric signals, a radial arm, a transmitter thereon, a central shaft for said arm, an escapement mechanism on said arm, a lever through which said shaft passes, a spring supported sleeve in said shaft capable of being depressed by said lever, a cam on said sleeve and means engaged by said cam to render said escapement mechanism inoperative.

15. In an apparatus for transmitting electric signals, a disc, having radial rows of holes therein, means to supply balls to said holes, key-operated means to selectively release balls from the rows of holes, and a special key to simultaneously clear all the holes of a row of its contained balls.

16. In apparatus for transmitting electrical signals, the combination with a plurality of balls, a stationary platform, a rotating disc above said platform and having several series of holes arranged in radial rows, and means for feeding in said radial series of holes in succession ball combinations representing the signals to be transmitted of an arm rotatably mounted on the axis of said disc, means to gradually push forward said arm in a direction opposite to that of the disc, and an electrical automatic transmitter including shoes and contacts operated by said shoes, each shoe capable of spanning two rows thereby preventing the breaking of contact when adjacent balls pass under a shoe.

17. In apparatus for transmitting electrical signals, the combination with a plurality of balls, of a fixed platform, a rotating disc above said platform and having a circular succession of radial series of holes, and means to feed in said radial series of holes in succession ball combinations representing the signals to be transmitted, of stationary terminals in said platform, an arm rotatably mounted on the axis of said disc, means to gradually rotate said arm on a shaft of said disc, an automatic transmitter in said arm comprising positive and negative contact, and a flexible cable connecting said terminals and contacts, said cable being wound on said shaft within a box constituted by two parts loosely mounted on a sleeve of said shaft, so that the cable may follow the movements of the rotating arm without undergoing dangerous tensions.

18. In apparatus for transmitting signals, a series of movable elements, means common to all of said elements for storing them, means to discharge said elements singly in rows, means to select discharged elements and cause selected elements to be retained, and means forming a closed circuit with said storage means to permit the selecting means to return unused elements to said storage means.

In testimony that I claim the foregoing as my invention, I have signed my name.

GIOVANNI MINIOTTI.